(12) United States Patent
Miyazawa et al.

(10) Patent No.: US 7,074,119 B2
(45) Date of Patent: Jul. 11, 2006

(54) POLISHING JIG, CONVEYOR TRAY, CONVEYING METHOD AND CONVEYING DEVICE

(75) Inventors: Makoto Miyazawa, Nagano (JP); Isao Karasawa, Nagano (JP); Yoshio Hori, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 46 days.

(21) Appl. No.: 10/484,844

(22) PCT Filed: Jul. 25, 2002

(86) PCT No.: PCT/JP02/07518

§ 371 (c)(1),
(2), (4) Date: Jan. 26, 2004

(87) PCT Pub. No.: WO03/009967

PCT Pub. Date: Feb. 6, 2003

(65) Prior Publication Data

US 2004/0231958 A1 Nov. 25, 2004

(30) Foreign Application Priority Data

| Jul. 25, 2001 | (JP) | ............................. 2001-224979 |
| Jul. 25, 2001 | (JP) | ............................. 2001-224980 |
| Jul. 11, 2002 | (JP) | ............................. 2002-203014 |
| Jul. 11, 2002 | (JP) | ............................. 2002-203015 |

(51) Int. Cl.
*B24B 41/06* (2006.01)
(52) U.S. Cl. ......................... 451/384; 451/42; 451/43; 451/364; 451/390
(58) Field of Classification Search ................ 451/42, 451/43, 364, 384, 390
See application file for complete search history.

(56) References Cited

U.S. PATENT DOCUMENTS

| 6,045,438 A | * | 4/2000 | Shay ........................... 451/384 |
| 6,110,016 A | * | 8/2000 | Coleman et al. .............. 451/42 |
| 6,126,528 A | * | 10/2000 | Sedlock ...................... 451/390 |
| 6,159,072 A | * | 12/2000 | Shibata .......................... 451/6 |
| 6,187,159 B1 | * | 2/2001 | Kamura et al. ......... 204/298.15 |

FOREIGN PATENT DOCUMENTS

| JP | 2-139173 A | 5/1990 |
| JP | 6-320465 A | 11/1994 |
| JP | 10-296603 A | 11/1998 |
| JP | 2002-11636 A | 1/2002 |

* cited by examiner

*Primary Examiner*—Lee D. Wilson
*Assistant Examiner*—Shantese McDonald
(74) *Attorney, Agent, or Firm*—Sughrue Mion, PLLC

(57) ABSTRACT

A polishing jig for mounting a working object lens on a polishing apparatus that polishes the concave surface of the working object lens, a conveyor tray for exclusive use for conveying the polishing jig, and a conveying method and a conveying apparatus for conveying the polishing jig or the like with the working object lens held thereon to a working apparatus such as the polishing apparatus. The polishing jig (1) includes a mounting potion (2) to be mounted on a chuck of a polishing apparatus, a ring-shaped closely contacting portion (3) for closely contacting with a convex surface (11) of a working object lens (10), and a filling gap portion (4) having an opening at the closely contacting portion for being filled with adhesive substance (7) which adheres to the convex surface of the working object lens closely contacted by the closely contacting portion to hold the working object lens.

12 Claims, 11 Drawing Sheets

(a)

POLISHING JIG, CONVEYOR TRAY, CONVEYING METHOD AND CONVEYING DEVICE

This is a National stage entry under 35 U.S.C. § 371 of PCT Application No. PCT/JP02/07518 filed Jul. 25, 2002; the above noted application is hereby incorporated by reference.

TECHNICAL FIELD

The present invention relates to a polishing jig for mounting a working object lens on a polishing apparatus that polishes the concave surface of the working object lens, a conveyor tray for exclusive use for conveying the polishing jig, and a conveying method and a conveying apparatus for conveying the polishing jig or the like with the working object lens held thereon to a working apparatus such as the polishing apparatus.

BACKGROUND ART

In recent years, an inner surface progressive multi-focal lens having a progressive face on the concave surface side (inner surface side) of a spectacle lens has been developed. The inner surface progressive multi-focal lens can reduce the image jump and the distortion which are defects of a progressive multi-focal lens which has a progressive face on the convex surface side thereof, and can raise the optical performance remarkably.

Polishing of a spectacle lens for generating an optical surface in the form of a concave surface of such an inner surface progressive multi-focal lens as described above forms the concave surface of the working object lens into a predetermined optical surface through cutting, grinding, mirror polishing and so forth. Such a numerically controlled machining apparatus as shown in FIG. 10 has been developed as a polishing apparatus which can cut the concave surface of a spectacle lens.

Processing data for numerical control calculated by a computer for calculation based on prescription data for a spectacle lens inputted from an inputting apparatus is transmitted to the numerically controlled machining apparatus 600 through a host computer and stored into an internal storage apparatus of the numerically controlled machining apparatus 600.

The numerically controlled machining apparatus 600 includes an X-axis positioning mechanism 610 and a Y-axis positioning mechanism 620 on a bed 601. The X-axis positioning mechanism 610 is driven to move in a substantially horizontal X-axis direction by an X-axis driving motor and an encoder 611. The position of the X-axis positioning mechanism 610 in the X-axis direction is indexed by the encoder 611. A work shaft rotating mechanism 612 is secured on the X-axis positioning mechanism 610 and has an axis of rotation coincident with a substantially horizontal Y-axis direction perpendicular to the X axis. A chuck 613 is attached to the work shaft rotating mechanism 612 and driven to rotate by a work rotary shaft driving motor and an encoder 614. The rotational position of the chuck 613 is indexed by the encoder 614. A working object lens (work) 10 is attached to the chuck 613 through a block jig. The Y-axis positioning mechanism 620 is driven to move in the Y-axis direction by a Y-axis driving motor and an encoder 621. The position of the Y-axis positioning mechanism 620 in the Y-axis direction is indexed by the encoder 621. Two cutting tool holders including a first cutting tool rest 622 and a second cutting tool rest 623 are secured on the Y-axis positioning mechanism 620, and a roughing cutting tool 624 is secured to the first cutting tool rest 622 while a finishing cutting tool 625 is secured to the second cutting tool rest 623.

According to a controlling method, the center coordinates of a tip end of the cutting tool 624 or 625 are positioned in a normal direction to a working point of the work 10 using the three axes of the X-axis positioning mechanism 610, Y-axis positioning mechanism 620 and work shaft rotating mechanism 612. Then, the positioning of the center coordinates of the tip end of the cutting tool corresponding to the working point is performed continuously to perform shape generation based on a lens design shape. At this time, the work 10 is rotated at a speed within 100 to 6000 rpm depending upon the shape of the work and the type of working between roughing and finishing by the work shaft rotating mechanism 612. The rotational position of the work 10 is indexed by the encoder 614, and the Y-axis positioning mechanism 620 and the X-axis positioning mechanism 610 are positioned in synchronism with the rotation of the work 10. In particular, while the work 10 is rotated, the relative positions between the cutting tools 624 and 625 and the work 10 in the direction of the Y axis coincident with the axis of rotation of the works 10 and the relative positions between the cutting tools 624 and 625 and the work 10 in the X-axis direction are synchronized with the rotation of the work 10.

The numerically controlled machining apparatus 600 changes over between the roughing cutting tool 624 and the finishing cutting tool 625 to perform a shaving process.

The numerically controlled machining apparatus 600 having such a configuration as described above can generate any surface shape and can perform shape generation of an inner surface progressive multi-focal lens.

Conventionally, such a block jig as shown in FIG. 11 is used as the block jig for mounting the working object lens 10 on the chuck 613 of the numerically controlled machining apparatus 600.

The block jig 400 shown includes a mounting portion 410 for mounting the block jig 400 on the chuck 613 of the machining apparatus 600, and a low melting point metal portion 420 for coupling the mounting portion 410 and the working object lens 10 to each other. The low melting point metal portion 420 is formed using a ring-shaped jig not shown as a mold by interposing the ring-shaped jig between the mounting portion 410 and the working object lens 10, filling molten metal having a low melting point into a gap of the ring-shaped jig, leaving the low melting point metal to be solidified and then removing the ring-shaped jig.

However, such a block jig 400 as described above is not necessarily suitable for the numerically controlled machining apparatus 600 because a block jig which has been used in a conventional polishing apparatus which uses rubbing is used as it is as the block jig 400 in the numerically controlled machining apparatus 600.

For example, when the mounting portion 410 is mounted and set in position on the chuck 613 of the numerically controlled machining apparatus 600, the reference for machining is provided by the angularity of a corner portion 430 at which the mounting portion 410 intersects with the low melting point metal portion 420 which uses a ring-shaped jig as a mold. However, a gap or the like appears between the mounting portion 410 and the low melting point metal portion 420 due to appearance of a cavity in or shrinkage of the low melting point metal portion 420. Therefore, the block jig 400 has a problem in that the angularity of the corner portion 430 cannot readily be formed accurately and numerically controlled mashing of a high degree of accuracy is difficult.

On the other hand, where the numerically controlled machining apparatus 600 is used, it is possible to automatically perform a series of processes of incorporating a conveying apparatus, carrying in and mounting a polishing jig having a working object lens held thereon on the chuck, performing polishing of the working object lens and then carrying out the polishing jig with the worked lens held thereon.

However, the conventional block jig 400 is not ready for such automatic conveyance.

Therefore, it is demanded to develop a novel polishing jig suitable for the numerically controlled machining apparatus 600 which performs shape generation of the concave surface of an inner surface progressive multi-focal lens.

Also a conveyor tray for exclusive use is required which can accommodate and protect such a polishing jig as just described with a working object lens held thereon and is ready for automation of a numerically controlled machining apparatus.

A numerically controlled machining apparatus can perform fully automatic polishing if a step of conveying a polishing jig with a working object lens held thereon to a polishing apparatus, another step of conveying the polishing jig with the worked lens held thereon to a next step and other necessary steps can be automated.

However, polishing of a spectacle lens involves special conditions. For example, usually a pair of left and right spectacle lenses are worked together. Also after polishing, it is demanded that a pair of left and right spectacle lenses be fed through a dyeing step, an inspection step, a packing step and so forth. Therefore, it is demanded to use a conveyor tray which accommodates a pair of left and right lenses. Besides, it is demanded that, upon polishing of a pair of left and right lenses, they may not be brought out of the paired relationship.

Further, in polishing of a lens by the numerically controlled machining apparatus 600, several minutes are required for working of one lens. Therefore, a one-by-one successive working method wherein working object lenses are taken out one by one from a conveyor tray and worked and a lens whose working is completed is conveyed back to its original position of the conveyor tray, whereafter another working object lens is conveyed into the polishing apparatus has a problem in that the efficiency is low.

The present invention has been made in view of such circumstances as described above, and it is a first object of the present invention to provide a polishing jig suitable for a numerically controlled machining apparatus.

It is a second object of the present invention to provide a conveyor tray for exclusive use for conveying a polishing jig of the type described.

It is a third object of the present invention to provide a conveying method wherein working object articles can be worked efficiently by a working apparatus which requires a long period of time for working while they are kept accommodated in pair in a conveyor tray of the type described.

It is a fourth object of the present invention to provide a conveying apparatus which can implement a conveying method of the type described.

DISCLOSURE OF INVENTION

In order to attain the first object described above, the polishing jig of the present invention has such a structure that a ring-shaped jig of a conventional block jig is integrated with a mounting portion. In particular, one of the reasons by which a conventional block jig uses a ring-shaped jig is that it is intended to perform eccentric working or addition of a prism by means of a conventional polishing apparatus which uses rubbing, and it is necessary to prepare a large number of ring-shaped jigs ready for such eccentric working and addition of a prism. However, with a numerically controlled machining apparatus, since eccentric working and addition of a prism can be performed through a program, it is not necessary to prepare a large number of ring-shaped jigs for such objects as described above. Further, since the convex surface side of an inner surface progressive multi-focal lens has a spherical surface or a rotationally symmetric aspheric surface, in order to keep the convex surface, only several different ring-shaped jigs are required. Therefore, it is possible to integrate a ring-shaped jig with a mounting portion.

Consequently, a corner portion which is used as a reference for polishing can be formed as part of a polishing jig, and therefore, the working accuracy is high.

Further, where the polishing jig further has a gripping portion which projects outwardly farther than the working object lens in a direction substantially perpendicular to a rotational center axis of the mounting portion, it is possible for a robot hand to grip the gripping portion of the polishing jig and convey the polishing jig. Consequently, the polishing jig can be conveyed automatically.

Further, where a first engaging portion for positioning is provided on the gripping portion, the position of the polishing jig in the rotational direction can be determined accurately using the first engaging portion as a reference position for positioning, and this can contribute to automation.

Furthermore, where a turning preventing projection or recess is provided on a wall face which defines the filling gap portion into which adhesive substance such as metal having a low melting point is to be filled, when the filled adhesive substance is exfoliated from the wall face of the filling gap portion, motion of the same in the rotational direction is suppressed. Therefore, accurate working can be anticipated.

Similarly, where a reverse taper for pull-out prevention portion is provided on a wall face which forms the filling gap portion, when the filled adhesive substance is exfoliated from the wall face of the filling gap portion, the adhesive substance can be prevented from coming off from the filling gap portion.

In order to attain the second object, a conveyor tray of the present invention has an accommodation section for receiving an outer peripheral portion of the gripping portion of the polishing jig, a through-hole for passing therethrough an ejecting jig which receives the polishing jig placed on the accommodation portion and moves up and down together with the polishing jig, and a second engaging portion for engaging with the first engaging portion of the gripping portion so that the polishing jig may be positioned and accommodated accurately.

Further, since left and right spectacle lenses are in most cases polished in pair, preferably the conveyor tray is configured so as to accommodate two polishing jigs therein.

In order to achieve the third object, according to a conveying method of the present invention, while a working object article is being worked by a working apparatus, another working object article is left in a standby state for working, and a worked article for which working is completed is returned to an original accommodation position of the conveyor tray. Consequently, working can be performed efficiency by the working apparatus even if the working apparatus has a long period of time for working. Further, a pair of working object articles accommodated in a conveyor tray are worked by the working apparatus while they are kept in pair.

In particular, when working is completed, the worked article for which the working is completed is carried out, and another working object article which has been in a standby state is mounted on the mounting apparatus to start working thereof. Then, while the working object article is being worked, the worked article is returned to its original accommodation position of the conveyor tray, and a next working object article is taken out from the conveyor article and conveyed into the working apparatus so that it thereafter remains standby in the working apparatus. Consequently, a working object article can be mounted rapidly, and besides conveyance can be performed within a period of time of working to perform working efficiency. Further, since a worked article is returned to its original position of the conveyor tray, the pair can be maintained.

Where a working object article accommodated in the conveyor tray is taken out at a predetermined transfer position and the worked article is returned to the original accommodation position of the conveyor tray at the transfer position, the conveying apparatus can be made comparatively simple and easy.

Further, in order to attain the fourth object, a conveying apparatus of the present invention is configured so as to have the following transfer means and conveying means thereby to implement the conveying method described above. In particular, the transfer means takes out a working object article from a conveyor tray at a particular transfer position and conveys the working object article to a working apparatus so that the working object article thereafter stands by in the working apparatus, takes out a worked article for which working by the working apparatus is completed, mounts the working object article in the standby state on the working apparatus, and conveys and accommodates the worked article into the conveyor tray at the transfer position. The conveying means controls the position of the conveyor tray such that, when the transfer means conveys the worked article to the transfer position, the accommodation position in which the worked article was accommodated is disposed at the transfer position.

Figure 7:
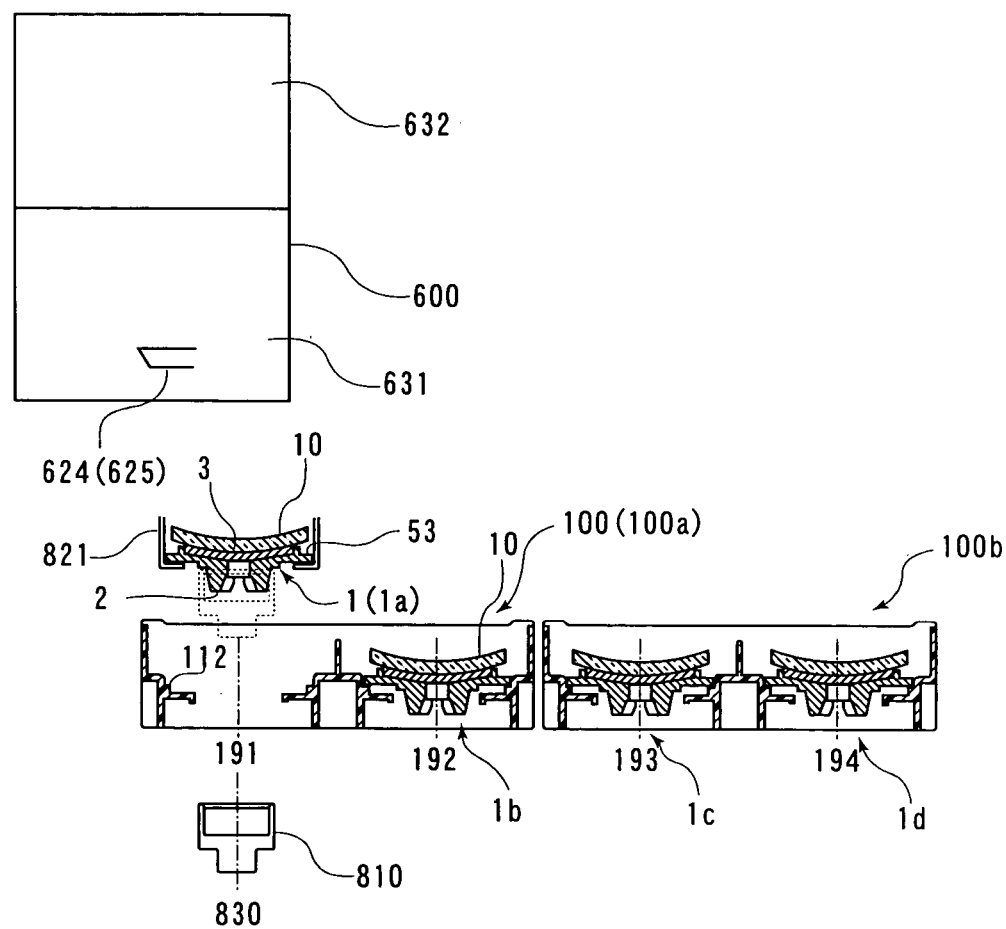
Figure 8:
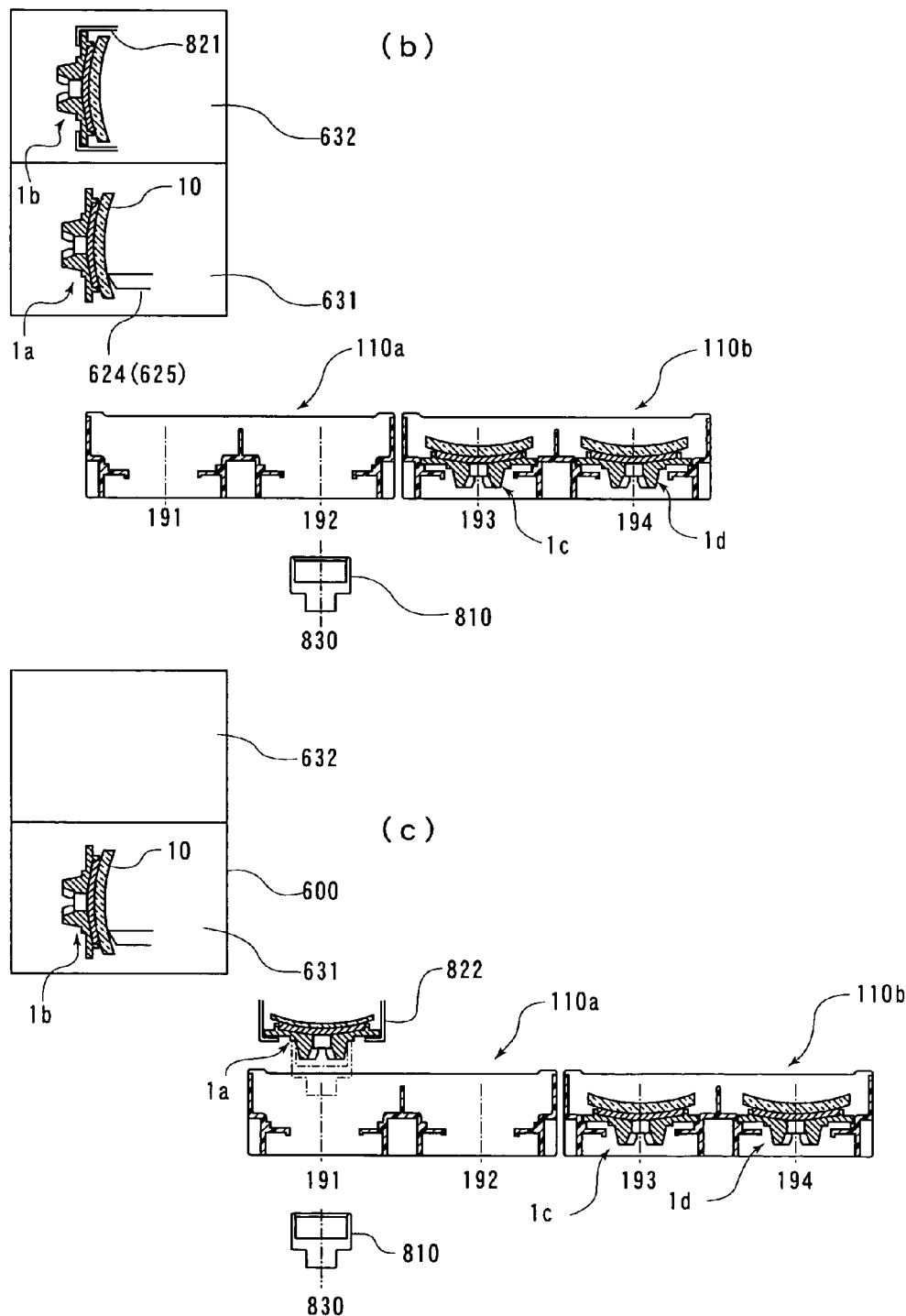
Figure 9:
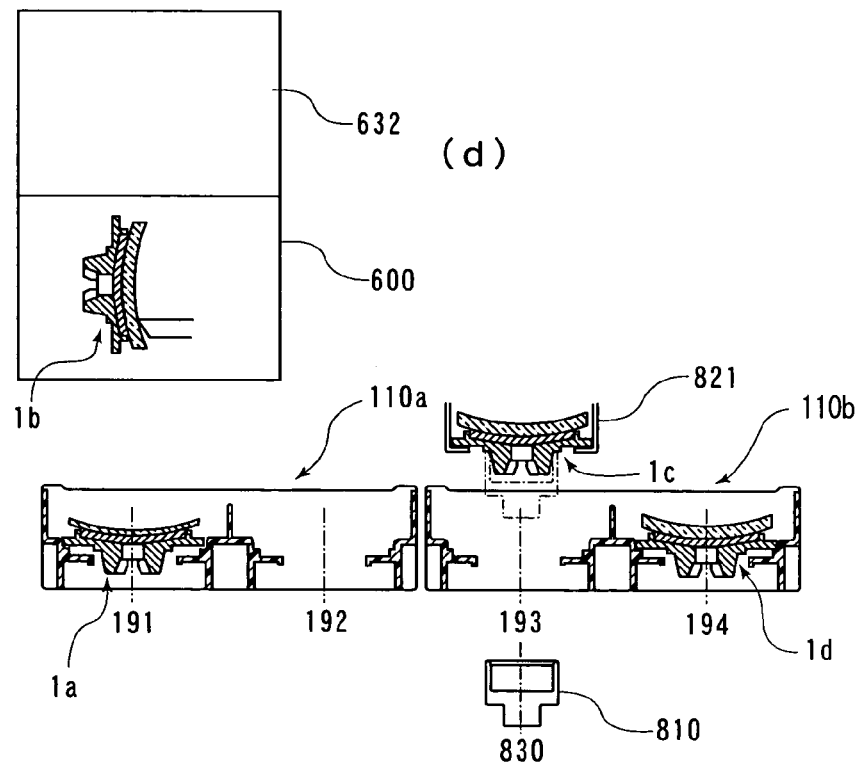
Figure 9:
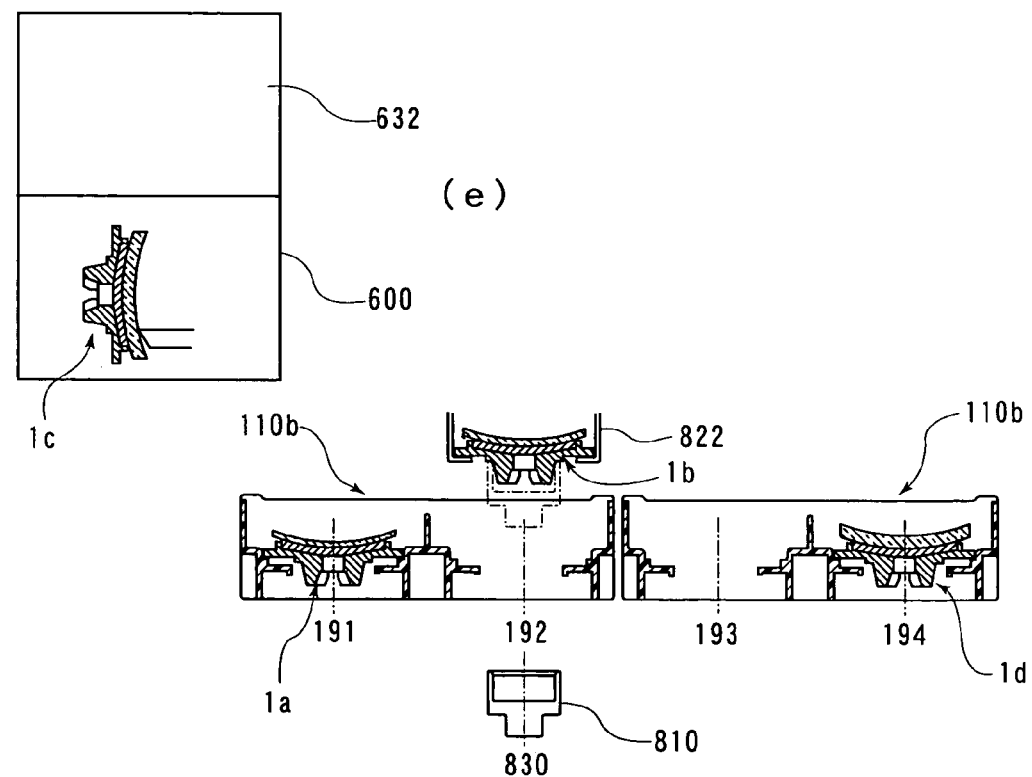
Figure 10:
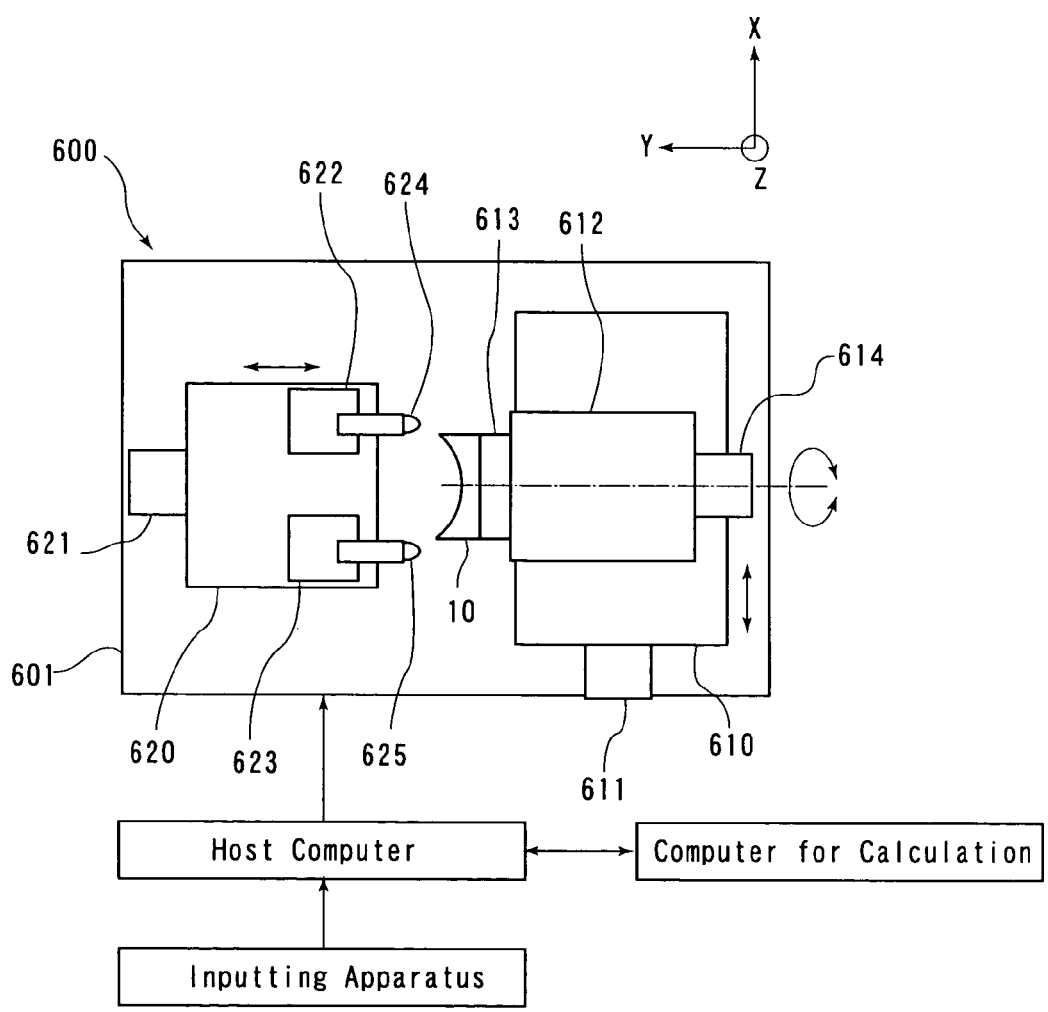
Figure 11:
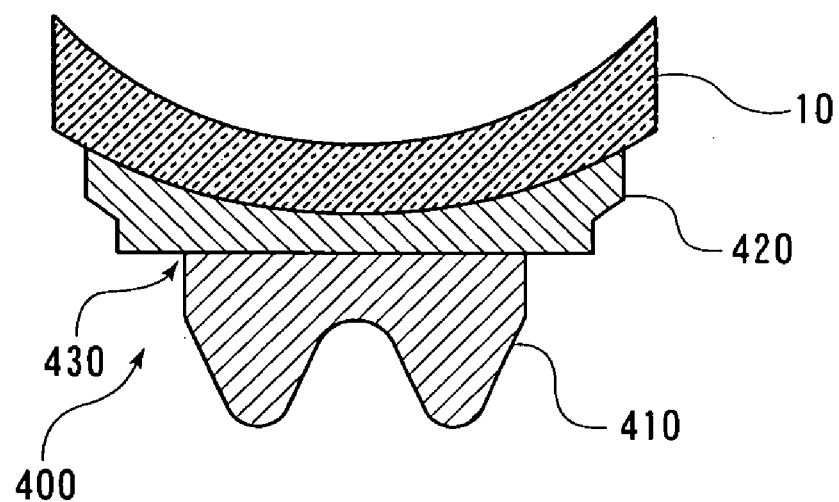

(a) of FIG. 7 is a sectional view of polishing jigs, each of which holds working object lenses accommodated in a conveyor tray, in a state wherein it is conveyed to the machining apparatus;

(b) and (c) of FIG. 8 are sectional views showing the working object lenses, which are held on the polishing jigs accommodated in the conveyor trays, in a state wherein they are transported to and machined by the machining apparatus;

(d) and (e) of FIG. 9 are sectional views showing the working object lenses, which are held on the polishing jigs accommodated in the conveyor trays, in a state wherein they are transported to and machined by the machining apparatus;

FIG. 10 is a schematic diagrammatic view of a general configuration showing an embodiment of a numerically controlled machining apparatus; and FIG. 11 is a sectional view showing a conventional block jig.

BEST MODE FOR CARRYING OUT THE INVENTION

In the following, embodiments of a polishing jig, a conveyor tray, a conveying method and a conveying apparatus of the present invention are described with reference to the drawings.

An embodiment of the polishing jig of the present invention is described with reference to FIGS. 1, 2 and 3.

The polishing jig 1 shown includes a mounting portion 2 for being mounted on a chuck 613 of a polishing apparatus such as the numerically controlled machining apparatus 600 shown in FIG. 10, a closely contacting portion 3 having a short-axis cylindrical shape for closely contacting with a convex surface of a working object lens, and a ring-shaped portion 5 for connecting the closely contacting portion 3 and the mounting portion 2 to each other and forming a filling gap portion 4 which has an opening at the closely contacting portion 3 and into which adhesive substance is to be filled.

The polishing jig 1 is made of a metal such as aluminum and is formed basically in a rotationally symmetrical form around a rotational center axis 21 of the mounting portion 2.

The mounting portion 2 has a hollow portion 22 along the rotational center axis 21, and a portion of the mounting portion 2 lower than a cylindrical portion 23 formed in a thick cylindrical shape has a tapered portion 24 provided thereon such that the thickness thereof decreases downwardly. A diametrical recess 25 is formed on the bottom of the tapered portion 24 and passes the rotational center axis 21. Another portion of the mounting portion 2 higher than the cylindrical portion 23 forms a disk portion 26 having a rather increased diameter in a direction perpendicular to the rotational center axis 21. An outer face of the cylindrical portion 23 and a lower face of the disk portion 26 are provided such that they extend orthogonally to each other.

The mutually orthogonal faces of the cylindrical portion 23 and the disk portion 26 serve as a working reference with which a chuck of a polishing apparatus contacts when the polishing jig 1 is mounted on the chuck and polished by the polishing apparatus. Particularly the parallelism of the lower face of the disk portion 26 has an influence on the accuracy of finishing. With the polishing jig 1 of the present embodiment, since the faces which serve as a working reference in this manner are formed by precision working in advance, positioning on the polishing apparatus can be performed accurately and high accuracy polishing can be anticipated.

A disk-shaped gripping portion 53 projects in a direction substantially perpendicular to the rotational center axis 21 from an outer face of the ring-shaped portion 5. The gripping portion 53 has an outer diameter greater than a working object lens such that it projects outwardly farther than the working object lens when the working object lens is held in a closely contacting relationship on the closely contacting portion 3. The gripping portion 53 has a function of being gripped by a robot hand when the polishing jig 1 is to be conveyed by the robot hand.

A recess 54 as an embodiment of a first engaging portion is provided on an outer periphery of the disk-shaped gripping portion 53. The recess 54 is provided for positioning of the polishing jig 1 in the rotational direction. A conveyor tray hereinafter described has a projection as an embodiment of a second engaging portion for engaging with the recess 54 when the polishing jig 1 is accommodated into the conveyor tray so that the polishing jig 1 can be accommodated accurately in a predetermined direction of the conveyor tray. Consequently, when the gripping portion 53 is gripped by a robot hand, it is directed in a predetermined direction so that the polishing jig 1 may be mounted accurately in a predetermined direction on a chuck of a polishing apparatus. Accordingly, the shapes of the first and second engaging portions may be any shapes for engaging with each other, and it is possible, for example, to form the first engaging portion as a projection and form the second engaging portion as a recess for engaging with the projection. Also it is possible to use a perforation and a projection which can be fitted in the perforation.

Three positioning marks 55 are provided on an upper face of the disk-shaped gripping portion 53 at different locations in the counterclockwise direction at intervals of 90 degrees from the recess 54 and extend radially from the rotational center axis 21.

The closely contacting portion 3 has a short-axis cylindrical shape and projects upwardly farther than the gripping portion 53 of the ring-shaped portion 5. An enlarged cross sectional view of the closely contacting portion 3 is shown in FIG. 2. While the cross section of the closely contacting portion 3 projecting from the gripping portion 53 has a substantially rectangular shape, an upper portion of an inner wall face 31 of the closely contacting portion 3 is inclined a little toward the rotational center axis 21 side from a direction (indicated by a broken line in FIG. 2) parallel to the rotational center axis 21. The inner wall face 31 of the closely contacting portion 3 forms the filling gap portion 4. Therefore, when adhesive substance is filled into the filling gap portion 4, the inner wall face 31 of the closely contacting portion 3 serves as a reversely tapering pull-out preventing portion since it exhibits an increasing width away from the opening of the closely contacting portion 3. Consequently, even if solidified adhesive substance is exfoliated, for example, from the wall face of the filling gap portion 4, there is no possibility that it may come off from the filling gap portion 4. An upper face of the closely contacting portion 3 is a portion which closely contacts with the convex surface of a working object lens, and a projection 32 having a triangular cross section is provided on the upper face of the closely contacting portion 3 so as to allow contact along a line.

Figure 1:
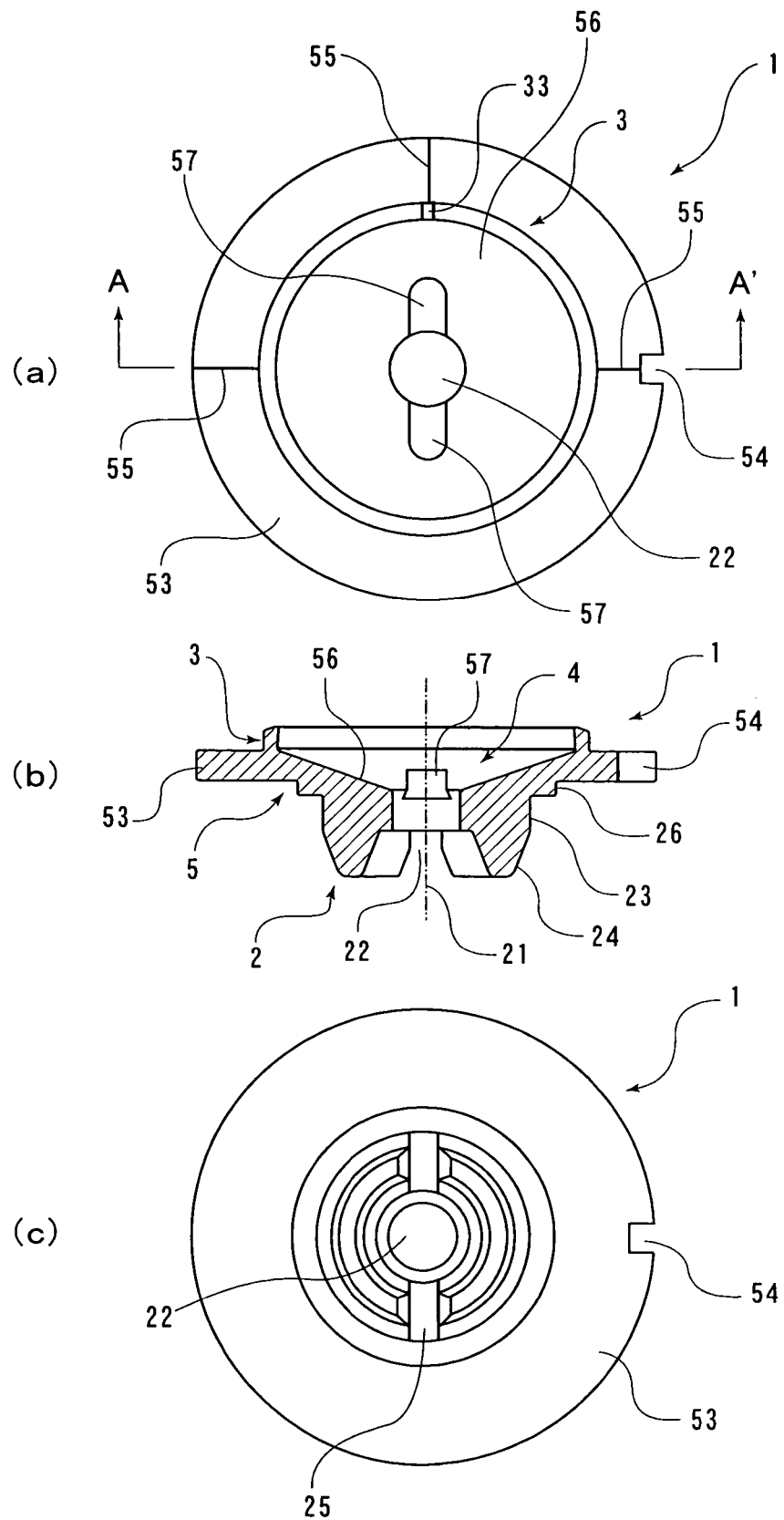
FIG. 1 shows an embodiment of a polishing jig of the present invention, and wherein (a) of FIG. 1 is a plan view, (b) of FIG. 1 is a sectional view taken along line A–A' of (a) of FIG. 1, and (c) of FIG. 1 is a bottom plan view.
Figure 2:
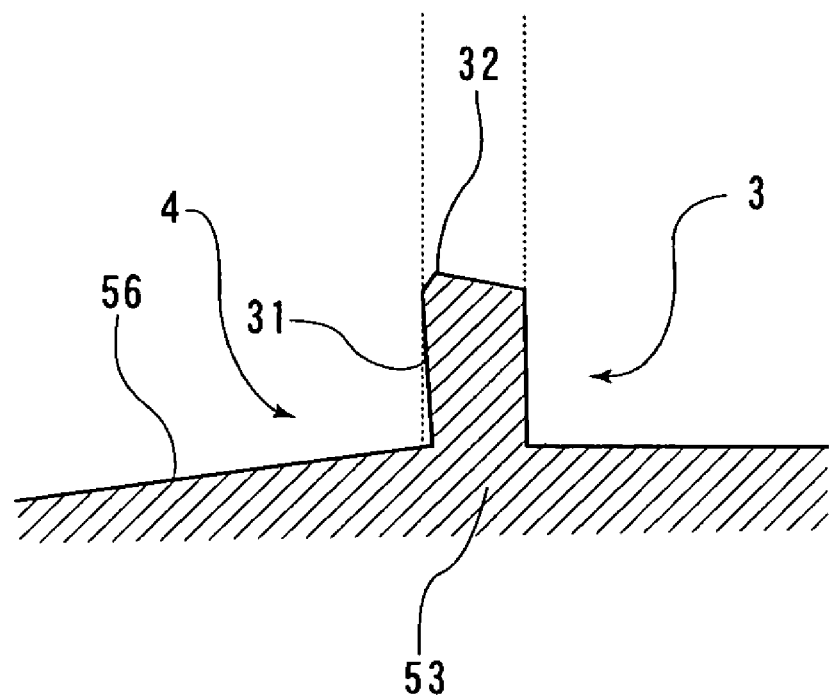
FIG. 2 is a sectional view showing, in an enlarged scale, an embodiment of a closely contacting portion of the polishing jig of the present invention.

A small recess 33 is provided on the upper face of the ring-shaped closely contacting portion 3 as shown in FIG. 1. The recess 33 functions as an air bleeder for air to be discharged from the filling gap portion 4 when adhesive substance is filled into the filling gap portion 4. Therefore, when adhesive substance is to be filled, adhesive substance in the form of liquid is filled from the lower side with the recess 33 directed upwardly, and the filling of the adhesive substance is ended when the adhesive substance finally leaks out from the recess 33.

As shown in FIG. 1, an inner wall face 56 of the ring-shaped portion 5 is formed in an inverted conical shape wherein the closely contacting portion 3 serves as an opening such that the diameter thereof decreases downwardly from the inner wall face 31 of the closely contacting portion 3 until it is integrated with the hollow portion 22 of the mounting portion 2. Accordingly, the hollow portion 22 of the mounting portion 2 and the filling gap portion 4 are communicated with each other.

A diametrically extending turning preventing groove 57 is provided on the inclined inner wall face 56 of the ring-shaped portion 5. The turning preventing groove 57 is communicated with the hollow portion 22 of the mounting portion 2. The bottom face of the turning preventing groove 57 is formed in a tapering state such that it has a width greater than that of an upper portion of the turning preventing groove 57. Since the inner wall face 56 of the ring-shaped portion 5 is formed in an inverted conical shape, when solidified adhesive substance is exfoliated from the inner wall face 56, the turning preventing groove 57 prevents the solidified adhesive substance from turning in the filling gap portion 4 thereby to allow accurate polishing. Accordingly, not only a recess but also a projection which projects from the inner wall face 56 may be used only if it functions as a turning preventing element. Or, concaves and convexes may be provided on the inner wall face 31 of the closely contacting portion 3.

In the polishing jig 1 shown in FIG. 1, the filling gap portion 4 into which adhesive substance is to be filled is formed from a portion surrounded by a convex surface of a working object lens, the inner wall face 31 of the closely contacting portion 3, the inner wall face 56 and the turning preventing groove 57 of the ring-shaped portion 5 and part of the inner wall face of the hollow portion 22 of the mounting portion 2 when the convex surface of the working object lens closely contacts with the projection 32 of the closely contacting portion 3.

In order to hold a working object lens by means of the polishing jig 1 of the present embodiment, the polishing jig 1 is disposed obliquely such that the recess 33 of the closely contacting portion 3 is positioned highest within the filling gap portion 4. Then, a convex surface 11 of the working object lens 10 is pressed strongly against the ring-shaped closely contacting portion 3 with the center of the working object lens registered with the rotational center axis 21 as seen in FIG. 3. Then, molten low melting point metal 7 is poured as adhesive substance in the form of liquid through the hollow portion 22 of the mounting portion 2 to fill up the low melting point metal 7 into the filling gap portion 4. Thereafter, when the low melting point metal 7 is solidified, the low melting point metal 7 adheres to the convex surface 11 surrounded by the ring-shaped closely contacting portion 3 of the working object lens 10 and the wall faces which define the filling gap portion 4. Consequently, the working object lens 10 can be held on the closely contacting portion 3.

Figure 3:
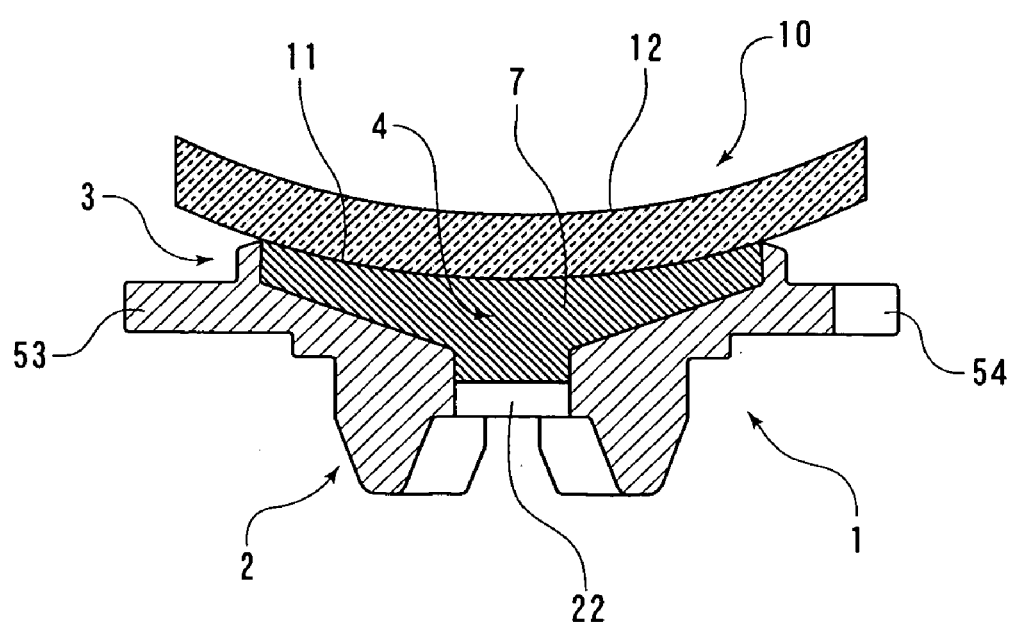
FIG. 3 is a sectional view showing the polishing jig of the present invention in a state wherein it holds a working object lens thereon.

If the working object lens 10 is held on the polishing jig 1 as shown in FIG. 3 and the mounting portion 2 is set in position, for example, on the chuck 613 of such a numerically controlled machining apparatus 600 as shown in FIG. 10 and then a concave surface 12 of the working object lens 10 is machined by the numerically controlled machining apparatus 600 while the working object lens 10 is rotated around the rotational center axis 21, then the concave surface 12 of the working object lens 10 can be shaped into a predetermined lens surface shape such as, for example, that of a progressive surface.

Since the polishing jig 1 of the present embodiment can form a face, which serves as a polishing working reference, accurately and includes the turning preventing groove 57 and the pull-out preventing portion 31, accurate polishing can be performed such that the play when the adhesive substance is solidified is little.

Further, since the polishing jig 1 includes the disk-shaped gripping portion 53, it is structured suitable for automation in that it can be automatically conveyed by a robot hand. Further, since the polishing jig 1 includes the recess 54 for positioning, it can contribute to automation in that it can be positioned automatically in a rotational direction.

With such a polishing jig 1 as described above, it is difficult to hold the working object lens 10 obliquely in order to provide a prism on the working object lens 10 or hold the working object lens 10 in an eccentrically displaced state in order to eccentrically work the same, and therefore, such working is preferably performed in accordance with a program of the numerically controlled machining apparatus 600. However, the polishing apparatus in which the polishing jig 1 of the present invention is used is not limited to the numerically controlled machining apparatus 600 shown in FIG. 10 but may be any numerically controlled polishing apparatus which can perform cutting, grinding, mirror polishing and so forth of a spectacle lens. For example, the polishing apparatus may be a numerically controlled polishing apparatus for performing mirror polishing.

Now, an embodiment of a conveyor tray of the present invention which is applied to an application for accommodating and conveying such a polishing jig 1 of the present invention as shown in FIG. 1 is described with reference to FIG. 4.

The conveyor tray 100 is a tool for accommodating and conveying the polishing jig 1 of the present invention in which such a working object lens 10 as shown in FIG. 3 is held. If an impact is applied to the working object lens 10 or the polishing jig 1 while the working object lens 10 is held on the closely contacting portion 3 through the low melting point metal 7, then the working object lens 10 is sometimes separated from the low melting point metal 7. The conveyor tray 100 has a function of transporting the working object lens 10 while protecting it so that an impact may not be applied to it.

The conveyor tray 100 has such a shape that two trays each in the form of a tube of a substantially square shape for accommodating one polishing jig 1 therein are connected to each other, and has a parallelepiped housing which is open at the top and the bottom thereof. A partition 102 is provided at a central portion of the conveyor tray 100 in the longitudinal direction such that it separates the conveyor tray 100 at the center of the conveyor tray 100 into left and right accommodation boxes 101, 101. The accommodation boxes 101, 101 have a same structure. Each of the accommodation boxes 101 has a quadrilateral plate 110 which is joined at an intermediate portion of an inner side face of the accommodation box 101 in the heightwise direction integrally to the inner side face therearound. A circular depression 111 having an inner diameter a little greater than the outer diameter of the disk-shaped gripping portion 53 of the polishing jig 1 is provided at the center of the quadrilateral plate 110, and an accommodation portion 112 is provided as a ring-shaped offset raised from the depression 111 on an outer peripheral portion of the circular depression 111. The accommodation portion 112 in the form of an offset receives a lower face of an outer peripheral portion of the gripping portion 53 of the polishing jig 1, and an outer circumferential face of the disks-shaped gripping portion 53 is positioned by an outer circumferential face of the depression 111. A through-hole 113 having a diameter greater than the disk portion 26 of the polishing jig 1 is perforated at a central portion of the depression 111. The through-hole 113 allows passage therethrough of a cylindrical ejecting jig 810 having an inner diameter a little greater than the outer diameter of the cylindrical portion 23 of the polishing jig 1.

A projection 115 is provided on an upper face of the accommodation portion 112 and serves as a second engaging portion for engaging with the recess 54 of the gripping portion 53 of the polishing jig 1. When the gripping portion 53 is accommodated into the accommodation portion 112, the recess 54 must be fitted with the projection 115. Consequently, the polishing jig 1 can be accommodated while it is directed accurately in the reference direction.

Four recessed portions 116 are provided on the quadrilateral plate 110 in such a manner as to split the accommodation portion 112. The recessed portions 116 allow an operation of gripping the gripping portion 53 of the polishing jig 1 with the fingers and accommodating it into the accommodation portion 112.

A clip portion 120 is provided on an outer side face of the conveyor tray 100 such that it can clip paper on which a bar code is recorded or some other paper necessary for manufacture.

With such a conveyor tray 100 as described above, the gripping portion 53 of a polishing jig 1 on which the working object lens 10 is held with the recess 54 and the projection 115 engaged with each other can be placed into each of the accommodation portions 112 and retained and conveyed safely so that the working object lens 10 of the polishing jig 1 on which the working object lens 10 is held may not be hit by any other article. For example, in a working area in which the working object lens 10 is mounted on the polishing jig 1, the polishing jig 1 on which the working object lens 10 is held can be placed into the conveyor tray 100. Further, the conveyor tray 100 can be used to an application wherein it is conveyed from the working area to a place in the proximity of a polishing apparatus and, after polishing is performed by the polishing apparatus, the polishing jig on which the worked lens is hold is accommodated back into the conveyor tray 100, whereafter the conveyor tray 100 is conveyed as it is to a mirror polishing apparatus so that mirror polishing is performed for the worked lens.

Figure 4:
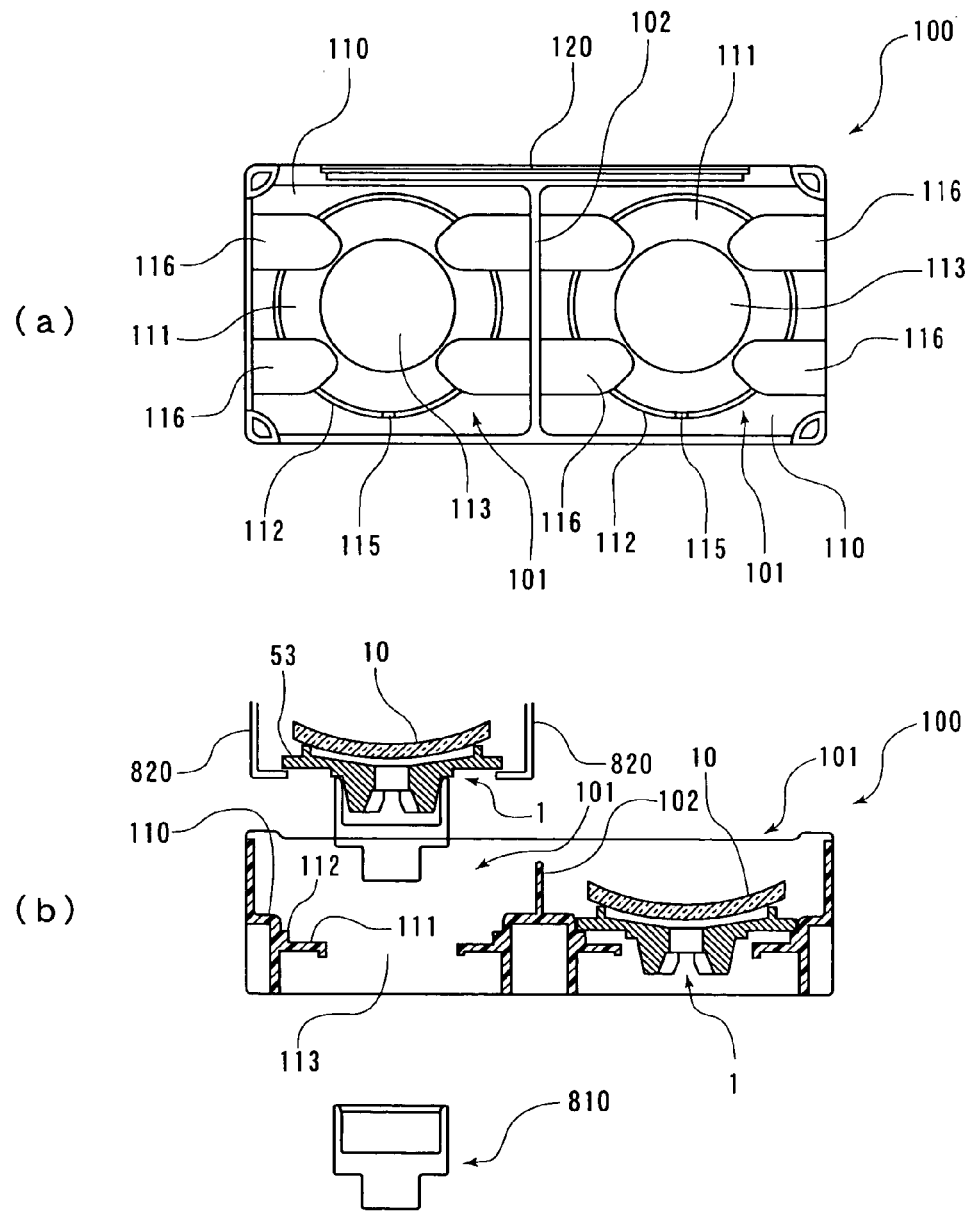
FIG. 4 shows an embodiment of a conveyor tray of the present invention, and wherein (a) of FIG. 4 is a top plan view, and (b) of FIG. 4 is a sectional view taken in a direction perpendicular to the top plan.

The operation of conveying the polishing jig 1 from the conveyor tray 100 to the polishing apparatus and mounting the polishing jig 1 on the polishing apparatus can be performed, for example, using a finger section 820 of a robot hand as shown in (b) of FIG. 4. A polishing jig 1 on which a working object lens 10 is held and which is held on the conveyor tray 100 transported by a conveyor or the like is stopped at a position just above the ejecting jig 810 which normally assumes a lowered position as shown in (b) of FIG. 4 but moves up when necessary. Then, the ejecting jig 810 is moved up. When the ejecting jig 810 passes through the through-hole 113 and receives the lower face of the disk portion 26 of the polishing jig 1 and then moves up with the polishing jig 1 placed thereon, the finger section 820 of the robot hand can grip the gripping portion 53 and convey the polishing jig 1 to the polishing apparatus.

The polishing jig 1 conveyed from the polishing apparatus by the finger section 820 of the robot hand as shown in (b)

of FIG. 4 after the polishing is completed is received by the upwardly moved ejecting jig 810. Then, after the finger section 820 of the robot hand releases the polishing jig 1, the ejecting jig 810 is lowered. Consequently, the gripping portion 53 of the polishing jig 1 can be placed and accommodated back into the accommodation portion 112 of the conveyor tray 100.

Therefore, the conveyor tray 100 of the present embodiment has a structure suitable for automatic conveyance.

The conveyor tray 100 can accommodate a pair of polishing jigs 1 therein. In short, the conveyor tray 100 can convey left and right spectacle lenses in pair. When only one of left and right spectacle lenses should be worked, only one lens is accommodated into the conveyor tray 100. Since the conveyor tray 100 can accommodate a pair of lenses in pair, there is an advantage that, for example, lenses can be fed in pair to an inspection step and so forth at which the lenses must be in pair.

The polishing jig and the conveyor tray of the present invention are not limited to the embodiments described above. While, for example, the grip portion has a disk-like shape, the shape of the grip portion is not limited to a disk-like shape, but any shape may be used only if the grip portion can be gripped ready by a robot hand. Further, naturally the mounting portion has a shape conforming with a chuck of a polishing apparatus by which it is mounted. Also the shape and so forth of the closely contacting portion can be modified suitably. Furthermore, the shape of the conveyor tray may be modified suitably such that, for example, it has recesses or the like at which the conveyor tray is to be gripped by a robot hand, and also the shape and so forth of the accommodation portion can be modified suitably. The conveyor tray is not limited to that which accommodates two polishing jigs, but may be modified so as to accommodate one or three or more polishing jigs.

Subsequently, an embodiment of a conveying method and a conveying apparatus of the present invention is described.

According to the conveying method of the present invention, one working object article is taken out from a conveyor tray, in which one or plural working object articles are accommodated at individual accommodated positions, and is conveyed to and then stands by at a working apparatus. Then, another article worked by the working apparatus is carried out from the working apparatus, and the working object article in the standby state is mounted on and worked by the working apparatus. Then, while the working object article is worked in this manner, the working object article carried out is returned to its original accommodation position of the conveyor tray.

In the embodiment described below, an example wherein spectacle lenses held on a polishing jig of the present invention are machined as working object articles is described.

Figure 5:
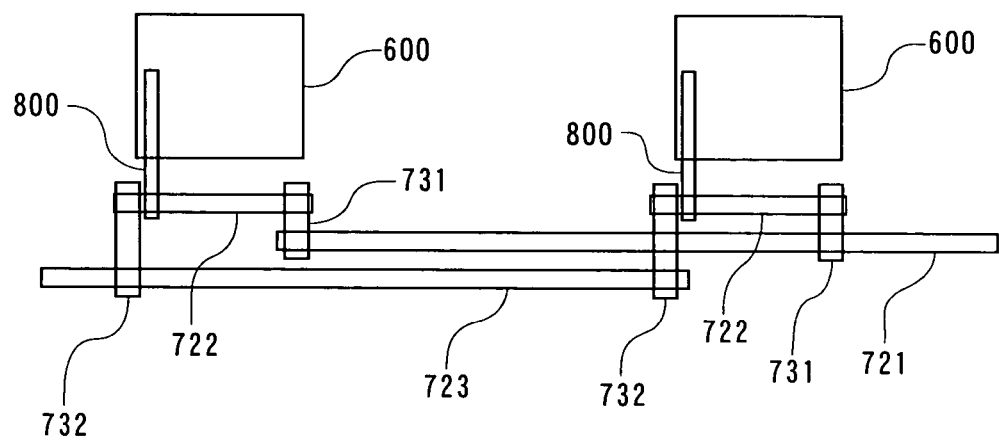
FIG. 5 is an arrangement plan showing an arrangement of a numerically controlled machining apparatus for spectacle lenses and a conveying apparatus for conveying a working object article to the machining apparatus.

Referring to FIG. 5, two numerically controlled machining apparatus 600 shown in FIG. 10 are disposed. A conveyor system for conveying a conveyor tray in a horizontal direction includes a first conveyor 721, a second conveyor 722 and a third conveyor 723. The first conveyor 721 conveys a conveyor tray from a place at which a working object article is accommodated into a conveyor tray to a place in the proximity of each of the machining apparatus 600. The second conveyors 722 are disposed for the individual machining apparatus 600 and each places a conveyor tray at a place at which a working object article is carried into and out from the conveyor tray to the machining apparatus 600 or vice versa. The third conveyor 723 conveys a working object article for which machining is completed to a next step. A conveyor tray is fed from the first conveyor 721 to one of the second conveyors 722 by a first robot hand 731, and fed from the second conveyor 722 to the third conveyor 723 by a second robot hand 732. A working object article is conveyed between each of the second conveyors 722 and the corresponding machining apparatus 600 by a robot hand 800 serving as a three-dimensional conveying means which grips the working object article.

Figure 6:
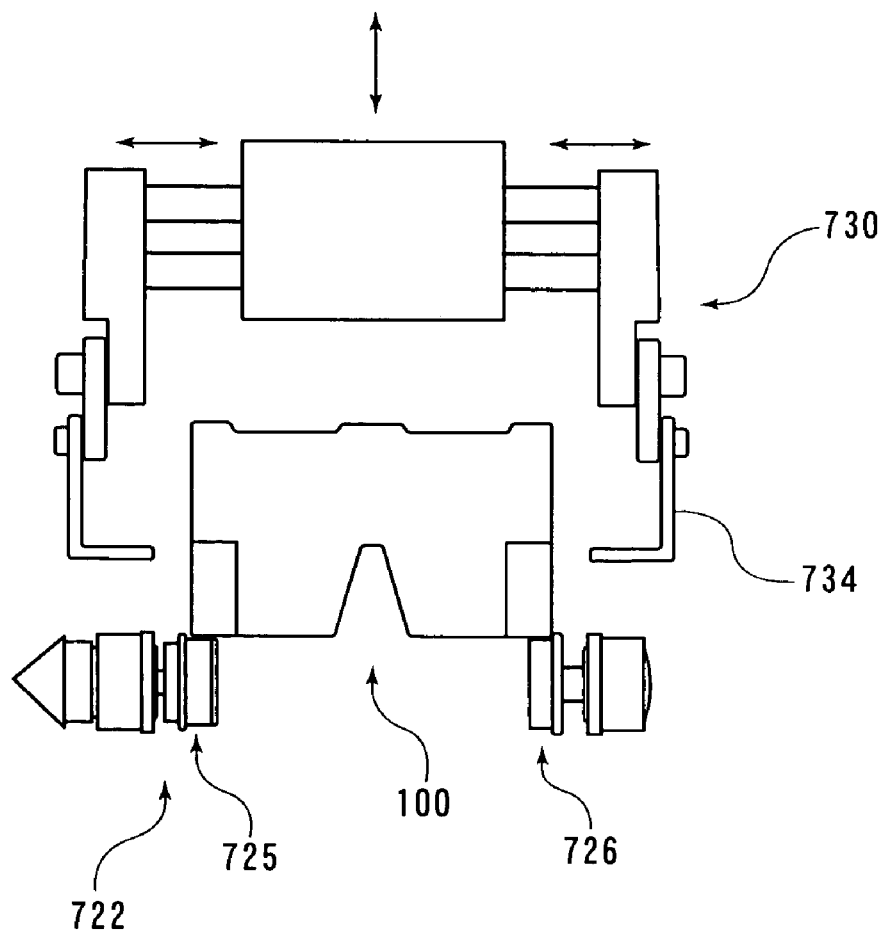
FIG. 6 is a side elevational view of a conveyor tray on a conveyor as viewed in a direction in which the conveyor tray is moved forwardly and backwardly.

An example of a finger section of a robot hand is shown in FIG. 6. Each of the first robot hand 731 and the second robot hand 732 for feeding a conveyor tray is configured such that a finger section 734 of the robot hand 730 grips the recesses provided on the side faces of the conveyor tray 100 from the opposite sides to lift and feed the conveyor tray 100 to another conveyor. Each of the second conveyors 722 includes rollers 725 and 726 for individually supporting the opposite end portions in the widthwise direction of the bottom face of the conveyor tray 100. Rotation of the rollers 725 and 726 is controlled to move the conveyor tray 100 forwardly or backwardly and stop the conveyor tray 100 at a predetermined position.

(a) of FIG. 7 to (e) of FIG. 9 are flow charts illustrating operation of a transfer means and operation of a conveying means when a working object article is taken out from a conveyor tray and conveyed to a machining apparatus and then the working object article after completion of machining is returned into the conveyor tray.

The transfer means includes a third robot hand 800 and an ejection apparatus, and the conveying means includes a second conveyor 722. It is to be noted that the second conveyor 722 is omitted in FIGS. 7 to 9.

As shown in (a) of FIG. 7, the working object article is a working object lens 10, and the working object lens 10 is held at the convex surface thereof by the polishing jig 1 of the present invention described hereinabove. The polishing jig 1 is mounted on the chuck 613 of the numerically controlled machining apparatus 600 shown in FIG. 10 and the concave surface of the working object lens 10 is machined by the cutting tool 624 or 625 of the machining apparatus 600. The polishing jig 1 includes a mounting portion 2 for being mounted on the chuck 613 of the machining apparatus 600, a closely contacting portion 3 for holding the working object lens 10, and a gripping portion 53 swollen in a direction perpendicular to the rotational center axis of the mounting portion 2. The closely contacting portion 3 holds the convex surface of the working object lens 10, for example, through a metal having a low melting point. The gripping portion 53 of the polishing jig 1 is a portion to be gripped by a robot hand and projects outwardly farther than the working object lens 10.

The conveyor tray 100 which accommodates the polishing jig 1 has a form of a parallelepiped box open at the top and the bottom thereof as shown in FIG. 4 and is adapted to accommodate two polishing jigs 1 therein. Usually, each polishing jig 1 in which a pair of left and right working object lenses 10 are held is accommodated in one conveyor tray 100. The conveyor tray 100 includes a ring-shaped accommodation portion 112 for receiving an outer circumferential edge of the gripping portion 53 of the polishing jig 1 such that the gripping portion 53 is placed on the accommodation portion 112 so that the polishing jig 1 can be accommodated accurately into a predetermined accommodation position.

The ejection apparatus not shown includes a cylindrical ejecting jig 810 which can receive the mounting portion 2 of the polishing jig 1 and contact with the disk portion 26 (refer to FIGS. 1 and 4) and moves the ejecting jig 810 upwardly and downwardly in a vertical direction. When the ejecting jig 810 moves up, it receives the polishing jig 1 from below and lifts the polishing jig 1 so that the polishing jig 1 can be ejected from the conveyor tray 100. The ejection apparatus performs an operation of receiving, at the ejecting jig 810 thereof, the polishing jig 1 from the conveyor tray 100 and ejecting the polishing jig 1 so as to be transferred to the robot hand 800 and another operation of receiving, at the ejecting jig 810 thereof, the polishing jig 1 on which the worked lenses for which machining is completed are held from the robot hand 800 and returning the polishing jig 1 to the conveyor tray 100. The ejecting jig 810 is disposed at one place of the second conveyor 722. Accordingly, the position at which the ejecting jig 810 is disposed is a transfer position 830 as a reference position at which the polishing jig 1 is transferred.

The robot hand 800 includes two feeding and removing finger sections which perform an operation of gripping the gripping portion 53 of the polishing jig 1 and carrying the polishing jig 1 independently of each other. The feeding finger section 821 performs an operation of gripping the gripping portion 53 of the polishing jig 1 placed on the ejecting jig 810, carrying the polishing jig 1 into the machining apparatus 600 and keeping the polishing jig 1 in a standby state at a standby position 632 in the proximity of a machining zone 631. Further, the feeding finger section 821 performs an operation of mounting the polishing jig 1 standing by at the standby position 632 on the chuck of the machining apparatus 600 when the removing finger section 822 (refer to (c) of FIG. 8) releases the polishing jig 1, which holds working object lenses for which working is completed, from the chuck of the machining apparatus 600. The machining apparatus 600 performs machining of the working object lens after the polishing jig is mounted on the chuck. On the other hand, the removing finger section 822 performs an operation of gripping the gripping portion 53 of the polishing jig 1 which holds a worked lens for which machining is completed to remove the polishing jig 1 from the chuck not shown of the machining apparatus 600 and conveying and placing the polishing jig 1 to and onto the ejecting jig 810 at the lifted position.

The second conveyor 722 serving as the conveying means not shown in FIG. 7 controls to move the conveyor tray 100 forwardly and backwardly in its lengthwise direction and stop the conveyor tray 100 at a predetermined position. The second conveyor 722 performs an operation of conveying a conveyor tray 100 which accommodates a polishing jig 1 on which working object lenses to be worked are held until the rotational center axis of the polishing jig 1 is disposed and stopped at a position just above the transfer position 830, another operation of placing the original accommodation position of the conveyor tray 100 in which the polishing jig 1 on which hold one of the working object lenses for which machining is completed was accommodated to a position just above the transfer position 830, and a further operation of conveying the conveyor tray 100 including the two working object lenses for which working is completed to a position at which the conveyor tray 100 is to be transferred to the third conveyor 723.

The numerically controlled machining apparatus 600 rotates the polishing jig 1 mounted on the chuck 613 and uses the cutting tool 624 or 625 to machine the concave surface of a working object lens 10 into a predetermined shape under numerical control. The working time required for machining of one working object lens 10 by means of the machining apparatus 600 is several minutes.

An operation of returning, using such an apparatus as described above, a polishing jig 1 accommodated in a conveyor tray 100 to its original accommodation position after working object lenses 10 held on the polishing jig 1 are machined by the machining apparatus 600 is described with reference to the flow charts of (a) of FIG. 7 to (e) of FIG. 9.

(a) of FIG. 7 shows a first conveyor tray 100*a* on the leading side and a second conveyor tray 100*b* on the trailing side in each of which two polishing jigs are accommodated. A first polishing jig 1*a* on which a working object lens 10 is held is accommodated at a first accommodation position 191 on the leading side of the first conveyor tray 100*a*, and a second polishing jig 1*b* on which another working object lens 10 is held is accommodated at a second accommodation position 192 on the trailing side of the first conveyor tray 100*a*. A third polishing jig 1*c* on which a further working object lens 10 is held is accommodated at a third accommodation position 193 on the leading side of the second conveyor tray 100*b*, and a fourth polishing jig 1*d* on which a still further working object lens 10 is held is accommodated in a fourth accommodation position 194 on the trailing side of the second conveyor tray 100*b*. The accommodation positions 191 to 194 in this instance are positions at each of which the rotational center axis 21 of the mounting portion 2 when a polishing jig 1 is placed on the accommodation portion 112 exists.

First, the second conveyor 722 moves the first conveyor tray 100*a* forwardly and stops the conveyor tray 100 so that the first accommodation position 191 on the leading side is disposed at the transfer position 830 as shown in (a) of FIG. 7. The ejection apparatus moves the ejecting jig 810 upwardly so that the ejecting jig 810 receives and ejects the first polishing jig 1*a* accommodated in the first accommodation position 191, and the feeding finger section 821 of the robot hand 800 grips and holds the first polishing jig 1*a*. The feeding finger section 821 conveys the first polishing jig 1*a* to the machining apparatus 600 and mounts the first polishing jig 1*a* on the chuck of the machining apparatus 600. The machining apparatus 600 starts machining of the working object lens 10 held on the first polishing jig 1*a* by means of the cutting tool 624 or 625.

Then, as shown in (b) of FIG. 8, during machining of the working object lens 10 held on the first polishing jig 1*a*, the ejecting jig 810 moves down to its original position, and then the second conveyor 722 moves the first conveyor tray 100*a* forwardly until the second accommodation position 192 is disposed at the transfer position 830. Then, the ejecting jig 810 is moved upwardly and receives and ejects the second polishing jig 1*b*, and the feeding finger section 821 of the robot hand 800 which has conveyed the first polishing jig 1*a* grips and holds the second polishing jig 1*b*. The feeding finger section 821 conveys the second polishing jig 1*b* into the machining apparatus 600 and stands by at the standby position 632 while it remains gripping the second polishing jig 1*b*. Meanwhile, the ejecting jig 810 moves down to its original position. (b) of FIG. 8 illustrates such a situation as described above.

Thereafter, as shown in (c) of FIG. 8, when machining of the working object lens held by the first polishing jig 1*a* comes to an end, the robot hand 800 uses the removing finger section 822 to grip the first polishing jig 1*a* and remove the first polishing jig 1*a* from the chuck not shown. Thereafter, the feeding finger section 821 in the standby state mounts the second polishing jig 1*b* on the chuck. Then, the machining apparatus 600 starts machining of the worked lens 10 held on the second polishing jig 1*b*. Meanwhile, the removing finger section 822 conveys the removed first polishing jig 1*a* from the machining apparatus 600 to the transfer position 830. At this time, the second conveyor 722 retracts the first conveyor tray 100*a* and disposes the first accommodation position 191, which is the original accommodation position of the first polishing jig 1*a*, at the transfer position 830. Then, the ejecting jig 810 is moved up, and the removing finger section 822 of the robot hand 800 places the first polishing jig 1*a* on the ejecting jig 810.

Thereafter, as shown in (d) of FIG. 9, when the ejecting jig 810 moves down, the first polishing jig 1*a* is accommodated back into the first accommodation position 191 with the gripping portion 53 thereof received by the accommodation portion 112 of the first conveyor tray 100*a*. The ejecting jig 810 moves down as it is to its original position. Thereafter, the second conveyor 722 moves the first conveyor tray 100*a* and the second conveyor tray 100*b* forwardly until the third accommodation position 193 of the second conveyor tray 100*b* is disposed at the transfer position 830. Then, the ejecting jig 810 moves up to receive and lift the third polishing jig 1*c*, and the feeding finger section 821 of the robot hand 800 grips the third polishing jig 1*c*. Then, the feeding finger section 821 conveys the third polishing jig 1*c* to the standby position 632 in the machining apparatus 600 and leaves the polishing jig 1 standing by at the standby position 632. In the meantime, the machining apparatus 600 performs machining of the working object lens secured to the second polishing jig 1*b*.

Then, as shown in (e) of FIG. 9, when machining of the working object lens secured to the second polishing jig 1*b* comes to an end, the removing finger section 822 of the robot hand 800 removes the second polishing jig 1*b* from the chuck and then the feeding finger section 821 mounts the third polishing jig 1*c* in the standby state on the chuck. Then, the machining apparatus 600 starts machining of the working object lens secured to the third polishing jig 1*c*. In the meantime, the removing finger section 822 of the robot hand 800 conveys the gripped second polishing jig 1*b* to the transfer position 830. At this time, the second conveyor 722 disposes the second accommodation position 192 which is the original accommodation position of the second polishing jig 1*b* at the transfer position 830. Then, the ejecting jig 810 moves up to receive the second polishing jig 1*b* from the removing finger section 822, and then when the ejecting jig 810 moves down, it returns to its original position while it accommodates the second polishing jig 1*b* back into the second accommodation position 192.

Thereafter, the same sequence of operations is repeated to repeat conveyance of the fourth polishing jig 1*d* to the transfer position 830, removal of the third polishing jig 1*c* with regard to which machining comes to an end and mounting of the fourth polishing jig 1*d*, returning of the third polishing jig 1*c* to the third accommodation position 193 and conveyance of a fifth polishing jig not shown to the transfer position 830.

In short, a working object article accommodated at an accommodation position just on the trailing side of an empty accommodation position in which a working object article being worked has been accommodated is conveyed to the standby position, and the worked article for which the working is completed is returned to the accommodation position just on the preceding side of the accommodation position in which the working object article being worked has been accommodated.

It is to be noted that, where only one polishing jig 1 is accommodated in the conveyor tray 100, an empty accommodation position is not selected based on information of a bar code attached to the conveyor tray 100.

In this manner, according to the conveying method and the conveying apparatus of the present embodiment, a polishing jig stands by at a standby position, and another polishing jig on which hold a worked lens for which working is completed and the polishing jig in the standby state are exchanged rapidly and working of a working object lens held on the polishing jig is started. Then, within the working time, the polishing jig on which the worked lens is held and the polishing jig on which the working object lens is held are exchanged and the polishing jig is placed into a standby state. Therefore, also when the polishing time is long, working can be performed efficiently.

Further, according to the conveying method and the conveying apparatus of the present embodiment, a polishing jig taken out from a conveyor tray so as to be used for working is returned into the same accommodation position of the same conveyor tray after the working. Therefore, a pair of polishing jigs accommodated in a conveyor tray before working are maintained as they are also after the working.

According to the conveying method and the conveying apparatus of the present embodiment, since the ejection apparatus is used to perform ejection of a polishing jig from a conveyor tray and accommodation of a worked article into the conveyor tray at the transfer position, the conveyor for conveying a conveyor tray is controlled to position the conveyor tray. According to this method, there is an advantage that the apparatus is simplified when compared with an alternative case wherein a robot hand is controlled so that a worked article is conveyed to a predetermined accommodation position for a conveyor tray by means of the robot hand or a robot hand performs a complicated operation so that a polishing jig is taken out from a conveyor tray.

The conveying method and the conveying apparatus of the present invention are not limited to the embodiment described above. For example, while an example wherein a spectacle lens carried on a polishing jig is machined is described hereinabove, the present invention is not limited to the particular example, but can be applied also to some other processing such as when a lens is machined or when a lens is mirror polished. Further, while the conveyor tray described accommodates two polishing jigs, it may otherwise accommodate one or three or more polishing jigs.

INDUSTRIAL APPLICABILITY

The polishing jig of the present invention is used as a jig for mounting a working object spectacle lens on an apparatus for polishing the inner surface of a spectacle lens and can be used to an application for manufacturing a spectacle lens.

The conveyor tray of the present invention has an application wherein it accommodates such a polishing jig as described above and protects and conveys the polishing jig, and therefore can be used to an application wherein a spectacle lens is manufactured.

According to the conveying method of the present invention, a working object article is taken out from such a conveyor tray as described above and conveyed into a working apparatus, and the worked article with which the working is completed is returned to the conveyor tray. Therefore, the conveying method can be utilized for manufacture of a spectacle lens applying a spectacle lens as the working object article.

The conveying apparatus of the present invention can be used for an application wherein, for example, a spectacle lens is manufactured.

DESCRIPTION OF REFERENCE NUMERALS 1 polishing jig
2 mounting portion
3 closely contacting portion
31 inner wall face (pull-out prevention portion)
4 filling gap portion
5 ring-shaped portion
53 gripping portion
54 recess
57 turning preventing groove
10 working object lens
100 conveyor tray
112 accommodation portion
113 through-hole
115 projection
600 machining apparatus
722 conveying means
800 transfer means
810 ejecting jig
830 transfer position
191 to 194 accommodation position

The invention claimed is:

1. A polishing jig, comprising:
a mounting portion to be mounted on a chuck of a polishing apparatus which performs polishing of a concave surface of a working object lens;
a ring-shaped closely contacting portion, for closely contacting with a convex surface of the working object lens; and
a filling gap portion having an opening at said closely contacting portion for being filled with adhesive substance which adheres to the convex surface of the working object lens closely contacted by said closely contacting portion and surrounded by said closely contacting portion to hold the working object lens,
wherein said polishing jig further comprises a gripping portion which projects outwardly farther than the working object lens in a direction substantially perpendicular to a rotational center axis of said mounting portion.

2. A polishing jig according to claim 1, wherein a first engaging portion for positioning is provided on said gripping portion.

3. A polishing jig according to claim 1, wherein a turning preventing projection or recess is provided on a wall face which defines said filling gap portion.

4. A polishing jig according to claim 1, wherein a pull-out preventing portion having a width which increases away from said opening of said closely contacting portion is provided on a wall face which forms said filling gap portion.

5. A conveyor tray in the form of a box open at the top thereof for containing a polishing jig which has a mounting portion to be mounted on a chuck of a polishing apparatus, a ring-shaped closely contacting portion for closely contacting with a working object lens, a filling gap portion having an opening at said closely contacting portion for being filled with adhesive substance, a gripping portion projecting outwardly farther than the working object lens in a direction substantially perpendicular to a rotational center axis of said mounting portion, and an engaging portion for positioning provided on said gripping portion, the polishing jig holding a working object lens via the adhesive substance filled in said filling gap portion, said conveyor tray comprising:
an accommodation section for receiving an outer peripheral portion of said gripping portion of said polishing jig;
a through-hole for passing therethrough an ejecting jig which receives said polishing jig placed on said accommodation portion and moves up and down together with said polishing jig; and
a second engaging portion for engaging with said first engaging portion.

6. A conveyor tray according to claim 5, wherein said conveyor tray accommodates two such polishing jigs.

7. A conveying method, comprising:
from within a conveyor tray in which one or a plurality of working object articles are accommodated at respective accommodation positions, taking out one of the working object articles and conveying the working object article to a working apparatus so that the working object article thereafter stands by in said working apparatus;
carrying out a worked article worked by said working apparatus from said working apparatus and mounting the working object article in the standby state on said working apparatus so as to be worked by said working apparatus; and
returning the worked article to an original one of the accommodation positions of said conveyor tray while the working object article is being worked.

8. A conveying method according to claim 7, wherein a working object article accommodated in said conveyor tray is taken out at a predetermined transfer position, and the worked article is returned to the original accommodation position of said conveyor tray at the transfer position.

9. A conveying method according to claim 7, wherein said conveyor tray accommodates a pair of working object articles.

10. A conveying method according to claim 7, wherein the working object article is a working object lens held on a polishing jig, and said working apparatus is a lens polishing apparatus.

11. A conveying apparatus comprising:
transfer means for
conveying a working object article, accommodated in a conveyor tray disposed at a particular transfer position, from the transfer position to a working apparatus so that the working object article thereafter stands by in said working apparatus,
taking out a worked article for which working by said working apparatus is completed,
mounting the working object article in a standby state on said working apparatus, and
accommodating the worked article into the conveyor tray conveyed to and disposed at the transfer position; and
conveying means for conveying the conveyor tray wherein one or a plurality of working object articles are accommodated at respective accommodation positions, successively disposing the accommodation positions for the working object articles at the transfer position and disposing, when said transfer means conveys the worked article to the transfer position, the accommodation position in which the worked article was accommodated at the transfer position.

12. A conveying apparatus according to claim 11, wherein said transfer means comprises:
an ejection apparatus for receiving the working object article at the transfer position and moving upwardly and downwardly together with the working object article; and three-dimensional conveying means for
conveying the working object article placed on said ejection apparatus to said working apparatus so that the working object article thereafter stands by in said working apparatus,
taking out the worked article for which working by said working apparatus is completed,
mounting the working object article in the standby state on said working apparatus, and
conveying the worked article to the transfer position, at which said three-dimensional conveying means places the worked article onto said ejection apparatus.

* * * * *